United States Patent [19]

Komoto

[11] Patent Number: 4,482,022

[45] Date of Patent: Nov. 13, 1984

[54] ELECTRONIC BALANCE WITH LOAD PLACEMENT DEVIATION CORRECTION

[75] Inventor: Akira Komoto, Otsu, Japan

[73] Assignee: Shimadzu Corporation, Kyoto, Japan

[21] Appl. No.: 335,363

[22] Filed: Dec. 29, 1981

[30] Foreign Application Priority Data

Dec. 29, 1980 [JP] Japan .................................. 55-185640

[51] Int. Cl.³ ....................... G01G 23/22; G01G 3/14; G01G 21/24

[52] U.S. Cl. ................................... 177/25; 177/210 C; 177/211; 177/255; 177/DIG. 6

[58] Field of Search ............... 177/25, 46, 202, 210 C, 177/211, 255, DIG. 6

[56] References Cited

U.S. PATENT DOCUMENTS

| 2,802,660 | 8/1957 | Williams, Jr. ........................ 177/255 |
| 3,164,014 | 1/1965 | Redner ............................ 177/211 X |
| 3,734,218 | 5/1973 | Kupper ........................... 177/255 X |
| 3,915,248 | 10/1975 | Paelian ............................ 177/255 X |
| 4,070,900 | 1/1978 | Engels ............................. 177/25 X |
| 4,121,049 | 10/1978 | Roeber ........................... 177/211 X |
| 4,344,495 | 8/1982 | Kovacs ........................... 177/255 X |

FOREIGN PATENT DOCUMENTS 859630 1/1961 United Kingdom ................ 177/211

Primary Examiner—George H. Miller, Jr.
Attorney, Agent, or Firm—Koda and Androlia

[57] ABSTRACT

An electronic balance includes a pan, a first means for measuring a load normally applied to the pan, a second means for detecting a possible deviation of the load acting point from the required point on the pan, a third means for correcting an error in the measured value due to the deviation, and a fourth means for outputting the corrected value.

10 Claims, 13 Drawing Figures

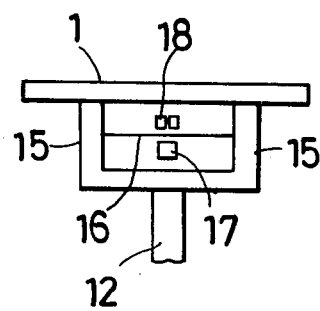
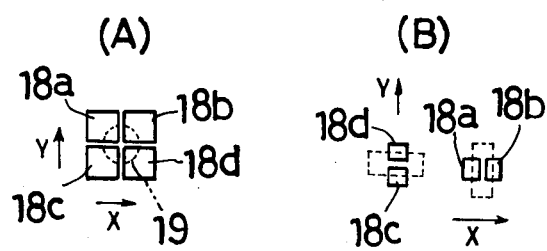
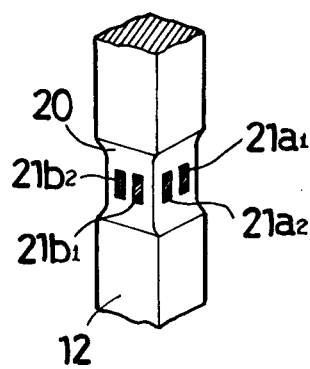
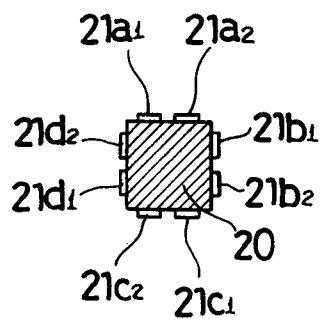
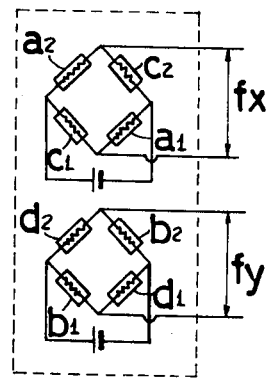
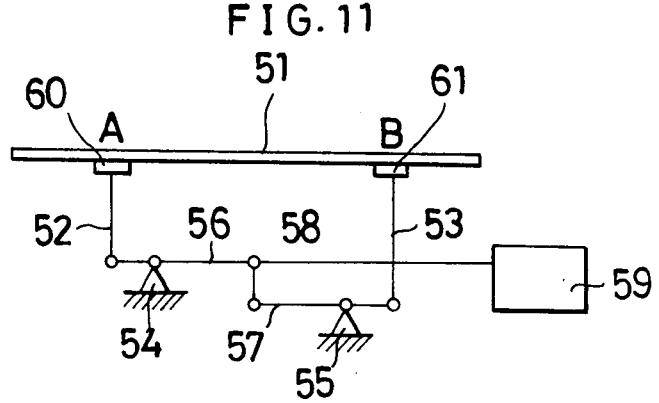

ELECTRONIC BALANCE WITH LOAD PLACEMENT DEVIATION CORRECTION

BACKGROUND OF THE INVENTION

The present invention relates to an electronic balance capable of correcting an error in the measured value, the error being due to the turning moment caused by a load being placed deviatedly from a required point of placement, such as the center of the pan.

In general, when a load is placed deviatedly from a required point of placement, such as the center of the pan, which will be hereinafter referred to as "eccentrically placed", the turning moment M exterts on the pan, thereby producing an error E in the measured value. An adjustment will be required for the geometrical precision of the Roberval mechanism of the balance. If the Roberval balance has a sufficiently rigid construction to receive a load without any strain, the relations between the turning moment M and the possible error E will become linear. FIG. 1 (I) shows every possible situation of the relations therebetween, in which the lines A and B show opposite extreme situations. A skilled operator could produce an optimum situation S within an allowable range $\delta$. However, this requires a high degree of skill and experience. For example, when a Roberval balance has a precision of $1/10^6$ to $\frac{1}{2} \times 10^6$, the adjustment must be made in the range of 0.1 to $0.05\mu$. On the contrary, if the Roberval balance does not have a sufficiently rigid construction, and receives a load with some degree of strain, the relations between the turning moment M and the possible error E cannot be linear but vary as shown in FIG. 1 (II), which shows every possible situation of the relations therebetween. Curves C and D show opposite extreme situations between which all possibilities can exist. However, in this case the most skilled operator could not produce an optimum situation T within an allowance range $\delta_2$. FIG. 1 (II) is a characteristic graph for an extremely high precision balance, and the allowable range $\delta_2$ is strict enough to admit of no negligence.

OBJECTS AND SUMMARY OF THE INVENTION

The present invention is directed toward solving the problems pointed out above, and has for its object to provide an improved electronic balance allowing of an easy and precise adjustment of an erroneous measured value due to the turning moment caused by an eccentric or deflected placement of a load on the pan.

Another object of the present invention is to provide an improved electronic balance dispensing with the necessity of geometrical manoeuvring adjustment, and allowing of electrical adjustment merely by operating an electric adjuster such as a variable resistor.

A further object of the present invention is to provide an improved electronic balance having its weight measuring section rigidly constructed and its load deviation detecting section resiliently constructed, thereby increasing the sensitivity of load deviation detection.

According to the invention, an electronic balance includes a pan, a first means for measuring a load normally applied to the pan, a second means for detecting a possible deviation of the load acting point from a required point of placement on the pan, a third means for correcting an error in the measured value due to the deviation, and a fourth means for outputting the corrected value.

A measured value W obtained by a measuring means, measured values $f_X$ and $f_Y$ as component forces obtained by a deflection detector, the values $f_X$ and $f_Y$ being respectively for the X-direction and the Y-direction, and a corrected value $F(W, f_X, f_Y)$ obtained by a correcting means have been found to satisfy the following equation, $$F(W,f_X,f_Y) = W + F(f_X) + F(f_Y) \tag{1}$$

where, $$F(f_X) = K_{1X} \cdot f_X + K_{2X} \cdot f_X^2 + K_{3X} \cdot f_X^3 + \ldots$$

$$F(f_Y) = K_{1Y} \cdot f_Y + K_{2Y} \cdot f_Y^2 + K_{3Y} \cdot f_Y^3 + \ldots$$

BRIEF DESCRIPTION OF THE DRAWINGS

The invention will be more particularly described by way of example with reference to the accompanying drawings, in which:

FIG. 5 is a further modified version of the embodiment in which a photo-electrical system is schematically shown;

FIG. 6 (A) and (B) are cross-sectional views showing an arrangement of sensors employed in the embodiment of FIG. 5;

FIG. 7 is a still further modified version of the embodiment in which strain gauges are employed;

FIG. 8 is a cross-sectional view particularly showing an arrangement of the strain gauges employed in the embodiment of FIG. 7;

FIG. 9 is an electric diagram employed in the embodiment of FIG. 7;

FIG. 11 is another modified version of the embodiment.

DETAILED DESCRIPTION OF THE PREFERRED EMBODIMENTS

Figure 2:
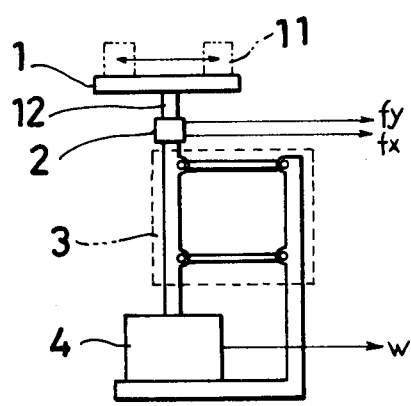
FIG. 2 is a schematic front view showing an electronic balance according to the invention.

Referring to FIG. 2, a pan 1 is supported by a Roberval mechanism 3, which includes a measuring section 4 adapted to measure a load normally applied thereto. The pan 1 and the Roberval mechanism 3 are connected by means of a support 12 to which a deflection detector 2 is secured so as to detect a possible deflection occurring in the support 12 due to the turning moment exerting on the pan 1. The support 12 is connected to the Roberval mechanism 3. As is well known, the turning moment is caused by a load 11 being eccentrically placed on the pan 1, which does not always mean that the load 11 is placed deviated from the center of the pan 1. It can mean that the load 11 is placed out of a required point of placement.

Functionally, the measuring section 4 measures the weight of a load placed on the pan 1, and outputs the measured value W. Structurally, it can be any system selected from an electromagnetic balance, a load cell adapted to detect a deflection occurring on a resilient or elastic body and signal it, or any other known systems.

The deflection detector 2 detects a deflection as its name implies, wherein the deflection is divided into two component forces (hereinafter referred to as a component) crossing each other at right angle. One of the components is outputted as a signal $f_X$ proportional to a degree of the turning moment in the X-direction, and the other component is as signal $f_Y$ proportional to a degree of the turning moment in the Y-direction.

Figure 3:
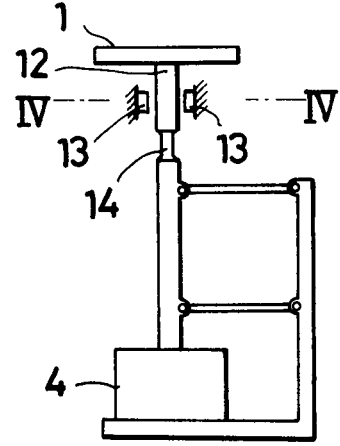
FIG. 3 is a modified version of the embodiment.
Figure 4:
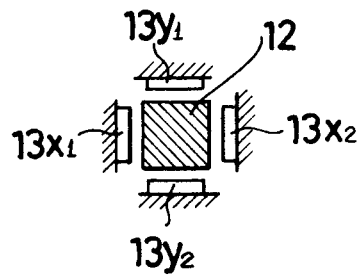
FIG. 4 is a cross-sectional view taken along the line IV—IV in FIG. 3.

Structurally, the deflection detector 2 can be any system selected from the following examples:

One example is shown in FIG. 3, which utilizes a static capacity whereby a deflection due to the turning moment is sensed. In this embodiment the support 12 has a rectangular cross-section as best shown in FIG. 4. The support 12 is surrounded by four electrodes $13X_1$, $13X_2$, $13Y_1$ and $13Y_2$ each of which is located adjacent to each face of the support 12, whereby four capacitors are constituted. A possible change in the static capacity is detected in a known manner, such as through a change in resonance frequency in an LC resonance circuit or through a change in the output voltage in the capacity detector circuit. When the support 12 declines in any direction, a pair of opposite capacitors have different capacities; one has an increased capacity whereas the other has a decreased capacity. This means that the deflection is doubly detected or that it is detected differentially with a doubly increased sensitivity. In FIG. 3 the support 12 is provided with a narrowed neck 14 designed to increase the resiliency of the support 12, thereby making the support 12 more responsive to the turning moment.

Referring to FIGS. 5 and 6(A) and (B), a photo-electrical method for detecting a possible deflection will be explained:

In this embodiment the support 12 has a pair of branches 15 on which the pan 1 is supported. Between the branches 15 there is provided a shutter 16 adapted to cut off the light from a light emission element 17 located above the support 12. Four light sensors 18a, 18b, 18c and 18d are located oppositely to the shutter 16, wherein the sensors are fixed adjacent to each other. The shutter 16 shown in FIG. 6(A) has a hole 19 produced in such a manner as to allow a substantially equal amount of light to be given to each sensor when no load is applied to the pan 1. The sensors 18a and 18b, and 18c and 18d are arranged in the X-direction, and detect a displacement of the shutter 16 in the X-direction, which is inputted to a differential amplifier. The sensors 18a and 18c, and 18b and 18d are arranged in the Y-direction, and detect a displacement of the shutter 16 in the Y-direction, which is also inputted to the differential amplifier.

In this way the movement of the shutter 16 in the X- and Y-direction is photo-electrically detected. In a modified version shown in FIG. 6(B) the round hole 19 is replaced by two slits. The sensors 18a and 18b detect a displacement of the shutter 16 in the X-direction, and the sensors 18d and 18c detect a displacement of the shutter 16 in the Y-direction.

A further version of the embodiment is shown in FIGS. 7 and 8, which is based on the principle of a strain gauge. The support 12 has four sides, and is additionally provided with a narrowed neck 20 in its middle portion. In each face two pairs of strain gauges $21a_1$, $21a_2$: $21b_1$, $21b_2$: $21c_1$, $21c_2$: $21d_1$, $21d_2$ are respectively provided. As shown in FIG. 9, a bridge circuit is constituted by the four strain gauges $a_1$, $a_2$, $c_1$, and $c_2$, which are provided on the faces crossing the X-direction, and another bridge circuit is constituted by the strain gauges $b_1$, $b_2$, $d_1$, $d_2$, which are provided on the faces crossing the Y-direction. In this way signals $f_X$ in the X-direction and signal $f_Y$ in the Y-direction are outputted.

Figure 10:
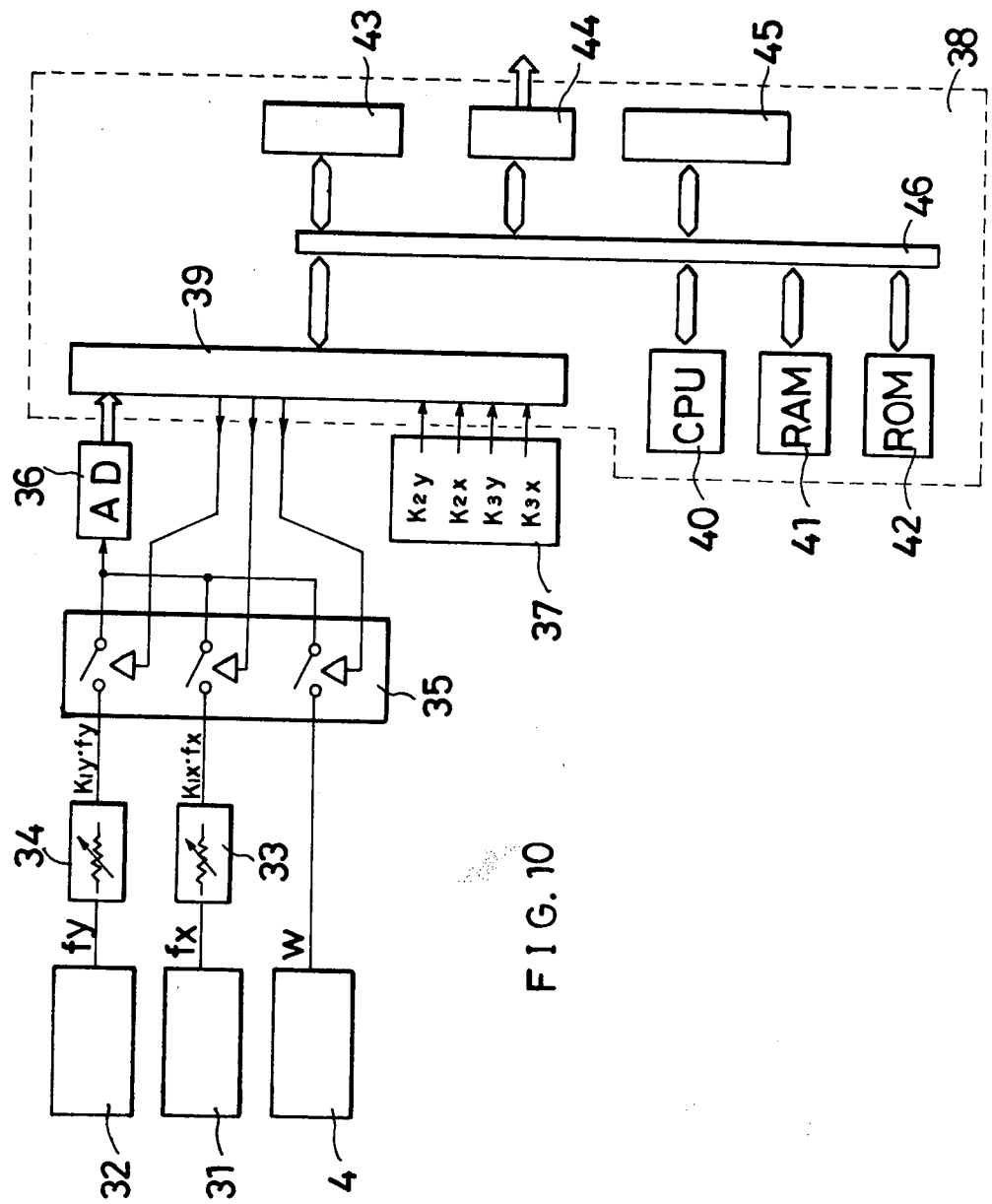
FIG. 10 is an electric block diagram of the electronic balance of the invention.

Referring to FIG. 10, an electric diagram used for the invention will be explained:

The reference numerals 31 and 32 designate deflection detector elements for the X-direction and the Y-direction, respectively. Outputs $f_X$ and $f_Y$ therefrom are amplified by amplifiers 33 and 34, respectively. These amplifiers 33 and 34 have gain adjusters including variable resistors. The resulting outputs are respectively $K_{1X} \cdot f_X$ and $K_{1Y} \cdot f_Y$.

As referred to above, the measured value W is outputted from the measuring section 4.

An analogue switch 35 is provided to enable a single analogue-digital converter 36 to convert signals from the three different circuits into digital form. The analogue switch 35 is quickly switched from one to another under the control of a CPU.

A coefficient setting unit 37 is designed so as to enter compensation coefficients $K_{2X}$, $K_{2Y}$, $K_{3X}$, $K_{3Y}$ ... of the second and higher order. The entries are performed by means of a numbered wheel whereby a desired number is set, and the set numbers are displayed by a digital indicator. Alternatively, the entries can be made by means of numbered keys (ten keys) in association with the use of a RAM.

A computer 38 includes a CPU 40 having an input/output interface 39, a clock generator, and an arithmetic operator: a RAM 41 for temporarily storing the measured data and the set values: a ROM 42 for storing programs and equations: an indicator 43 for indicating the arithmetic results: a digital output interface 44 for outputting the arithmetic results outwards: an operating switch 45 for instructing a tare deduction and inputting the frequency of averaging of use, a unit conversion ratios and compensation coefficients: and a bus line 46 for connecting all these elements.

A typical example of the operation will be explained:

If the load 11 is eccentrically placed on the pan 1, the turning moment will result, which is detected as two components for the X-direction and for the Y-direction. The operator determines the first order compensation coefficients $K_{1X}$ and $K_{1Y}$ for each direction by adjusting the variable resistor in the amplifiers 33 and 34, whereby the data $K_{1X} \cdot f_X$ and $K_{1Y} \cdot f_Y$ corrected to the first order are inputted to the computer 38. As referred to above, the computer 38 is storing secondary and higher order compensation coefficients, that is, $K_{2X}$, $K_{2Y}$, $K_{3X}$, $K_{3Y}$ ..., and by referring to these higher order corrected values, the measured value W obtained from the measuring section 4 is processed. Then the corrected value $f(W, f_X, f_Y)$ is derived from the equation (1), and the corrected value is outputted.

Figure 1:
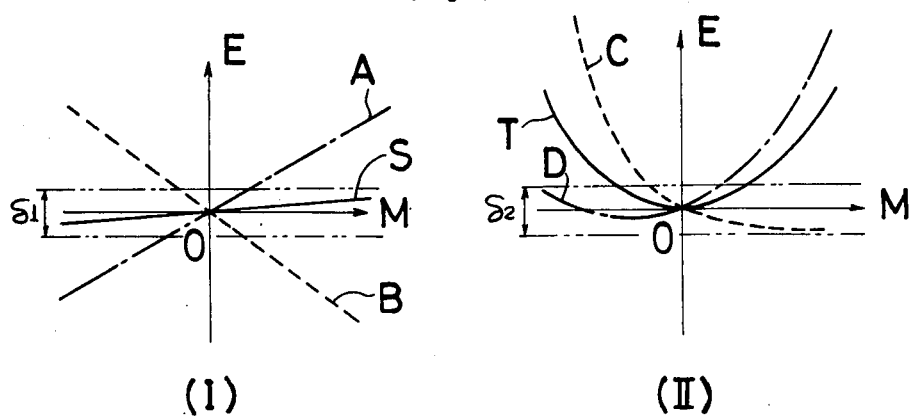
FIG. 1 (I) and (II) are characteristic graphs showing relations between the turning moment M and an error E in the measured value.

As a result, the curves C and D in FIG. 1 (II) are corrected and straightened, and are placed into the allowable range $\delta_2$ like the line S in FIG. 1(I).

Referring to FIG. 11, a further modified embodiment will be explained:

The illustrated block diagram shows the basic principle underlying this embodiment, that is, a deflection is detected as components. This version is particularly adapted for use in large-scaled electronic balances.

A pan 51 is supported by two supports 52 and 53; the support 52 provides a force acting line to a lever 56 resting on a fulcrum 54, and the support 53 provides a force acting line to a lever 57 resting on a fulcrum 55. The two levers 56 and 57 are connected to each other by means of a pin 58, and are connected to a load measuring section 59. Each of the supports 52 and 53 is provided with a load measuring scale 60 and 61 respectively, which are designed to measure the degree of a possible deflection occurring when a load is eccentrically placed on the pan 51, wherein the deflection is detected as components. The scales 60 and 61 do not call for a highly precise construction, but desirably, they can measure forces acting both in the plus and in the minus direction, because when the load is placed at an extreme end portion outside the point (A) (or (B)) a force acts in the minus direction on the point (B) (or (A)). For the scales 60 and 61 strain gauges can be employed.

Let the components be $W_A$ and $W_B$, and the distances from a load acting point up to the points (A) and (B) be $l_A$ and $l_B$, $$W_A + W_B = W \tag{2}$$

$$W_A \cdot l_A = W_B \cdot l_B \tag{3}$$

By these equations the load acting point can be located.

In FIG. 11 the scales 60 and 61 can be provided at the places indicated by the reference numerals 54 and 55. In this case, a larger force will act at the point (A) or (B) at a ratio depending upon the lever ratio. This increment must be corrected. This embodiment has an advantage that lead lines can stably and safely be located in a fixed portion of the apparatus.

What is claimed is:

1. An electronic balance comprising a pan for receiving a load to be weighed, a first means for measuring said load on said pan, said means being adapted to measure a load normally acting on said pan, a second means for detecting a possible deviation of the line of action of said load from the required point of placement on said pan, a third means for correcting an error in the measured value in accordance with a detected degree of deviation, and a fourth means for outputting said corrected value.

2. An electronic balance as defined in claim 1, wherein said deviation is detected as a deflection occurring on the support of said pan due to the turning moment, wherein said deflection is divided into two components crossing each other, and wherein said second means comprises two detectors, one being for the X-direction and the other being for the Y-direction.

3. An electronic balance as defined in claim 1, wherein said second means comprises one electrode movable in association with said pan and another located oppositely but spacedly to said electrode, thereby detecting changes in the static capacity between said pair of electrodes.

4. An electronic balance as defined in claim 1, wherein said second means comprises a photo-electrical unit including sensors and a light emission element with a shutter being interlocated therebetween, said shutter being movable in association with said pan and having an opening in its center, said opening allowing an equal amount of light to be given to each of said sensors when no load is applied to said pan.

5. An electronic balance as defined in claim 4, wherein said opening in said shutter is a round hole.

6. An electronic balance as defined in claim 4, wherein said opening in said shutter is a slit.

7. An electronic balance as defined in claim 1, wherein said second means comprises a strain sensor provided in a support of said pan, said support being movable in association with said pan, thereby enabling said strain sensors to detect a possible deflection occurring in said support.

8. An electronic balance as defined in claim 1, wherein said first means comprises a Roberval mechanism connected to said pan by means of a support, said support including a narrowed neck designed to impart an increased resilient nature to said support, and wherein said second means has sensors located between said pan and said narrowed neck in said support.

9. An electronic balance as defined in claim 1, wherein said second means supports said pan at plural points, and wherein said first means is provided at each of said points, thereby measuring a possible deflection through the measurement of divided forces acting on each of said points.

10. An electronic balance as defined in claim 1, wherein said third means comprises a digital logical operation unit, a gain adjusting means located between an analogue output line of said second means and an input line of said digital logical operation unit, and means for entering an operation coefficient to said digital logical operation unit.

* * * * *